US012633767B2

(12) United States Patent
Lim et al.

(10) Patent No.: US 12,633,767 B2
(45) Date of Patent: May 19, 2026

(54) EXTENDING BATTERY LIFE AFTER LONG-TERM AND HIGH-TEMPERATURE STORAGE

(71) Applicant: Google LLC, Mountain View, CA (US)

(72) Inventors: James Robert Lim, Mountain View, CA (US); Chang Hong Ye, Mountain View, CA (US); David Wang, San Jose, CA (US); Yuandan Li, Campbell, CA (US)

(73) Assignee: Google LLC, Mountain View, CA (US)

( * ) Notice: Subject to any disclaimer, the term of this patent is extended or adjusted under 35 U.S.C. 154(b) by 616 days.

(21) Appl. No.: 18/253,288

(22) PCT Filed: Oct. 26, 2022

(86) PCT No.: PCT/US2022/078689
§ 371 (c)(1),
(2) Date: May 17, 2023

(87) PCT Pub. No.: WO2023/107785
PCT Pub. Date: Jun. 15, 2023

(65) Prior Publication Data
US 2024/0356357 A1 Oct. 24, 2024

Related U.S. Application Data

(60) Provisional application No. 63/265,020, filed on Dec. 6, 2021.

(51) Int. Cl.
*H02J 7/90* (2026.01)
*H02J 7/00* (2026.01)
(Continued)

(52) U.S. Cl.
CPC ................ *H02J 7/977* (2026.01); *H02J 7/82* (2026.01); *H02J 7/84* (2026.01); *H02J 7/875* (2026.01)

(58) Field of Classification Search
CPC .... H02J 7/971; H02J 7/977; H02J 7/82; H02J 7/875; H02J 7/84; H02J 7/92; H02J 7/933;
(Continued)

(56) References Cited

U.S. PATENT DOCUMENTS 9,500,538 B2 * 11/2016 Maleki ................ H01M 10/486
2005/0024022 A1 * 2/2005 Howard .................. H02J 7/875
320/135
(Continued)

FOREIGN PATENT DOCUMENTS

CA 2788244 A1 * 3/2013 ........... G01R 31/392
JP 2000277168 A 10/2000
(Continued)

OTHER PUBLICATIONS

"Foreign Office Action", AU Application No. 2022361894, Feb. 14, 2024, 2 pages.
(Continued)

*Primary Examiner* — Rexford N Barnie
(74) *Attorney, Agent, or Firm* — Colby Nipper PLLC

(57) ABSTRACT

The present document describes techniques for extending battery life after long-term and high-temperature storage. These techniques delay charging of a battery to detect battery conditions and determine whether the battery was exposed to high temperatures while in an idle or low-power state for a long period of time. These techniques include a methodology to relax and refresh an anode surface of the battery, after high-temperature storage, through distinct and tailored discharges prior to beginning a normal charge profile. These techniques can be applied to a wide range of chemistry platforms, which may have kinetic (Li-ion) limitations, to extend the longevity of the battery by reducing
(Continued)

lithium plating and capacity degradation caused by long-term, high-temperature storage.

20 Claims, 9 Drawing Sheets

(51) Int. Cl.
*H02J 7/82* (2026.01)
*H02J 7/84* (2026.01)

(58) Field of Classification Search
CPC .... H02J 7/685; H02J 7/007194; H02J 7/0048; H02J 7/005; H02J 7/0069; H01M 10/44; H01M 10/486
USPC ........................................ 320/153, 133, 150
See application file for complete search history.

(56) References Cited

U.S. PATENT DOCUMENTS

| | | | |
|---|---|---|---|
| 2014/0101476 A1 | 4/2014 | Lu et al. | |
| 2014/0274225 A1 | 9/2014 | Lacatus et al. | |
| 2017/0234931 A1 | 8/2017 | Moore et al. | |
| 2020/0150185 A1* | 5/2020 | Ramezan Pour Safaei | G01R 31/367 |
| 2020/0395775 A1 | 12/2020 | Hayayama et al. | |
| 2021/0028639 A1 | 1/2021 | Zhao et al. | |

FOREIGN PATENT DOCUMENTS

| | | | |
|---|---|---|---|
| JP | 2001136673 A | 5/2001 | |
| JP | 2003143769 A | 5/2003 | |
| JP | 2009181910 A | 8/2009 | |
| JP | 2009232632 A | 10/2009 | |
| JP | 2018198473 A | 12/2018 | |
| JP | 2019092339 A | 6/2019 | |
| JP | 2019106333 A | 6/2019 | |
| WO | 2015162877 A1 | 10/2015 | |

OTHER PUBLICATIONS

"Foreign Office Action", KR Application No. 10-2023-7016968, Jul. 10, 2025, 6 pages.

"Foreign Office Action", JP Application No. 2023-530643, Aug. 13, 2024, 9 pages.

"Foreign Office Action", CA Application No. 3198175, Oct. 3, 2024, 4 pages.

"International Search Report and Written Opinion", Application No. PCT/US2022/078689, Feb. 23, 2023, 11 pages.

Chang, "The State of Charge Estimating Methods for Battery: A Review", Jul. 2013, 8 pages.

"International Preliminary Report on Patentability", Application No. PCT/US2022/078689, Jun. 5, 2024, 8 pages.

* cited by examiner

100

102

104

Network
126

Electronic Device 102

Battery 104

Battery-Manager Module 106

Battery-Charging
Manager 110

Battery-Conditions
Manager 112

Pre-Charge Profile(s) 114

Charge Profile(s) 116

Discharge Profile(s) 118

Battery-Usage Data 120

Temperature Data 122

State-of-Charge Data 124

External Power Source
108

200

500

600

Detect an electrical connection to an external
power source for charging a battery
602

Delay charging of the battery to perform
a health check on the battery
604

Determine current battery conditions
606

Determine previous battery conditions between
a most-recent charge event and a time when
the electrical connection was detected
608

A

800

900

Detect an electrical connection to external
power source for charging a battery
902

Is
Timer A1
expired?
904

No

B

Yes

Delay charging of the battery
906

Determine current battery conditions
908

Select a discharge profile
910

Apply a discharge mode to discharge the battery
according to the selected discharge profile
912

C

EXTENDING BATTERY LIFE AFTER LONG-TERM AND HIGH-TEMPERATURE STORAGE

RELATED APPLICATION(S)

This application is a national stage entry of International Application No. PCT/US2022/078689, filed Oct. 26, 2022, which claims the benefit of U.S. Provisional Application No. 63/265,020, filed Dec. 6, 2021, the disclosures of which are incorporated herein by reference in their entirety.

BACKGROUND

Many battery-powered devices are placed outdoors and exposed to high-temperature environments, particularly if exposed to direct sunlight. Exposure to such high temperatures over time long periods of time, however, can degrade the batteries. It is desirable for some outdoor devices (e.g., devices used as part of a "smart home" system, mobile devices) to have batteries that are able to withstand high-temperature exposures for safety and longevity (e.g., three or more years).

Lithium-ion (Li-ion) batteries are susceptible to degradation at higher temperatures, resulting in accelerated aging, overpotential, and gas formation. Li-ion batteries are also susceptible to degradation at lower voltages, resulting in copper dissolution and gas formation. To prevent such degradation, many Li-ion batteries are held at medium ranges of state-of-charge (SOC) (e.g., 30% to 80% SOC) for longevity. Such medium ranges of SOC are generally considered stable for Li-ion batteries.

Some batteries could experience thermal events after having been stored for long periods of time (e.g., one or more weeks), then allowed to equilibrate to room temperature, and subsequently charged. These thermal events could be caused by Li-plating at an anode surface of the battery due to high-temperature storage, which impacted graphite/anode material kinetic (diffusion) processes upon subsequent room temperature charging from such a state, particularly at medium and low states-of-charge. Further, the batteries generated heat due to electrolyte reduction of lithium metal at the graphite/anode surface, releasing exothermic energy. These thermal events cause capacity degradation and consumption of active lithium, reducing the life of the batteries.

SUMMARY

The present document describes techniques for extending battery life after long-term and high-temperature storage. These techniques delay charging of a battery to detect battery conditions and determine whether the battery was exposed to high temperatures while in an idle or low-power state for a long period of time. These techniques include a methodology to relax and refresh an anode surface of the battery, after high-temperature storage, through distinct and tailored discharges prior to beginning a "normal" charge profile. These techniques can be applied to a wide range of chemistry platforms, which may have kinetic (Li-ion) limitations, to extend the longevity of the battery by reducing lithium plating and capacity degradation caused by long-term, high-temperature storage.

In some aspects, a method performed by an electronic device is disclosed. The method includes detecting an electrical connection to an external power source for charging a battery of the electronic device and in response to the detecting, delaying the charging of the battery. The method further includes determining one or more current battery conditions and determining previous battery conditions of the battery between a most-recent charge event and a time of the detecting of the electrical connection to the external power source. In some implementations, the previous battery conditions include temperature data of the battery and battery-usage data. In some implementations, the battery-usage data indicates that the battery has been in an idle state or a low-power state over a duration of time. The method also includes determining a value indicative of an average temperature of the battery over the duration of time based on the temperature data. In addition, the method includes, based on the one or more current battery conditions, the duration of time being greater than a time threshold, and the value indicative of the average temperature being greater than a temperature threshold, applying a discharge mode prior to initiating a charge mode for the battery. In some implementations, the discharge mode is configured to cause the battery to be discharged according to at least one of a plurality of discharge profiles. Also, the method includes, after completion of the discharge mode, applying the charge mode to cause the battery to be charged according to at least one of a plurality of charge profiles.

In other aspects, an electronic device is disclosed. The electronic device includes a battery for providing power to the electronic device, a memory for storing computer-executable instructions, and a processor for executing the instructions stored in the memory to implement a battery-manager module. The battery-manager module is configured to detect an electrical connection to an external power source for charging a battery of the electronic device and in response to the detecting, delay the charging of the battery to perform a health check of the battery. The battery-manager module is also configured to determine one or more current battery conditions and determine previous battery conditions of the battery between a most-recent charge event and a time of the detecting of the electrical connection to the external power source. In some implementations, the previous battery conditions include temperature data of the battery and battery-usage data, the battery-usage data indicating that the battery has been in an idle state or a low-power state over a duration of time. In addition, the battery-manager module is further configured to determine a value indicative of an average temperature of the battery over the duration of time based on the temperature data. The battery-manager module is also configured to, based on the one or more current battery conditions, the duration of time being greater than a time threshold, and the value indicative of the average temperature being greater than a temperature threshold, apply a discharge mode prior to initiating a charge mode for the battery, the discharge mode configured to cause the battery to be discharged according to at least one of a plurality of discharge profiles, e.g., so as to relax and refresh an anode structure of the battery. Additionally, the battery-manager module is configured to, after completion of the discharge mode, apply the charge mode to cause the battery to be charged according to at least one of a plurality of charge profiles.

This summary is provided to introduce simplified concepts of extending battery life after long-term and high-temperature storage, which is further described below in the Detailed Description. This summary is not intended to identify essential features of the claimed subject matter, nor is it intended for use in determining the scope of the claimed subject matter.

BRIEF DESCRIPTION OF THE DRAWINGS

The details of one or more aspects of extending battery life after long-term and high-temperature storage are described in this document with reference to the following drawings. The same numbers are used throughout the drawings to reference like features and components.

DETAILED DESCRIPTION

Figure 1:
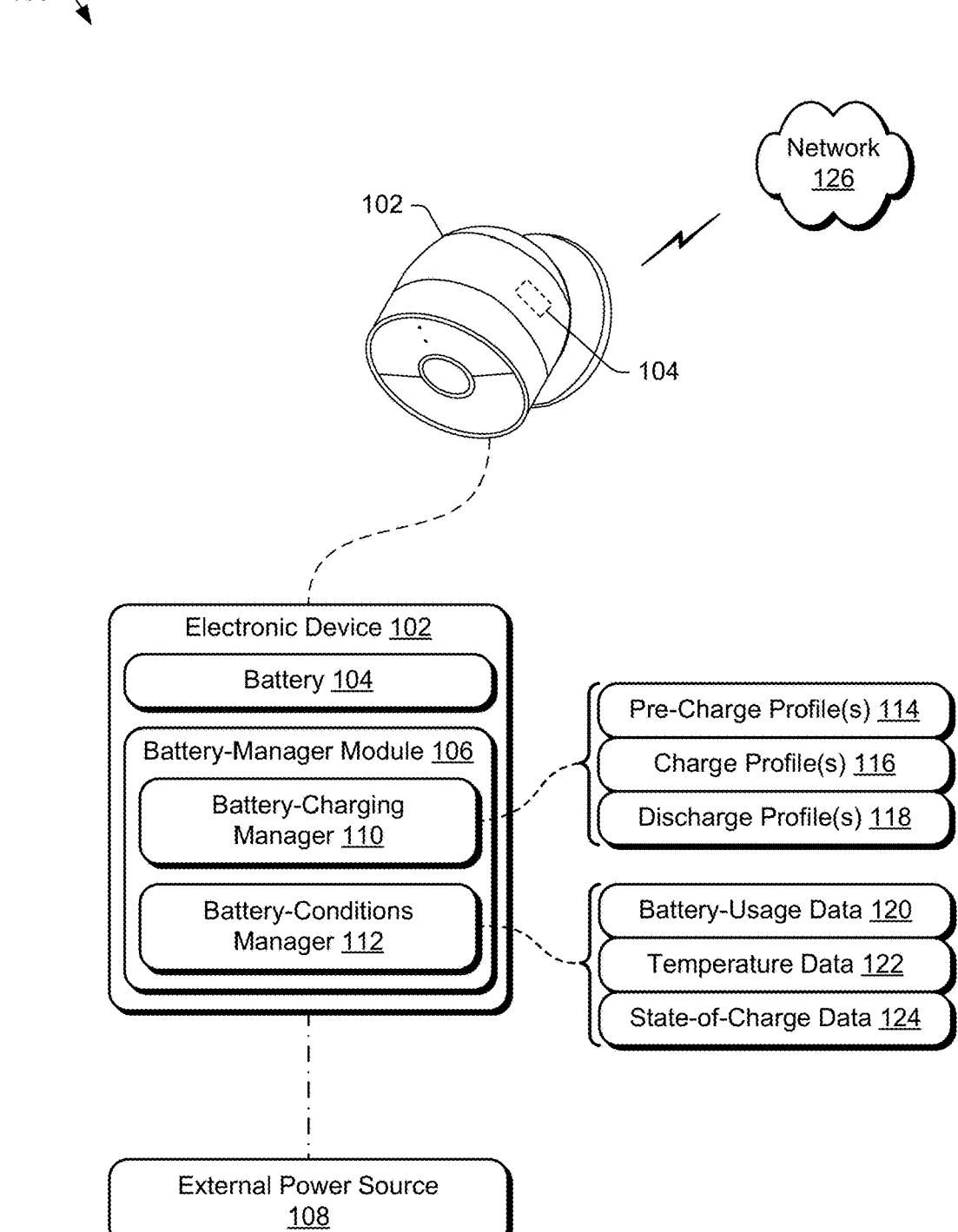
FIG. 1 illustrates an example implementation of a battery-powered electronic device in accordance with the techniques described herein.

The present document describes techniques for extending battery life after long-term and high-temperature storage. The techniques described herein track how long a battery has been idling or in low-power operation and exposed to higher temperatures for a relatively long duration of time before its next charge cycle. Upon charge, immediate charging is delayed until the system is able to calculate and determine if normal charging is permissible or if a battery-longevity technique is to be implemented. If the battery-longevity technique is applicable, depending on a chemistry platform and the SOC of the battery, the battery is first discharged at a low rate or pulse rate before charging at a low rate or pulse rate to enable anode structure relaxation and refreshment before beginning a normal charging profile.

The techniques described herein provide enhanced safety, reliability, performance, and sustainability/longevity for the battery. For instance, implementing the described techniques reduces lithium plating on the anode structure of the battery, which in turn reduces potential exothermic energy release. Also, using these techniques provides a wider outdoor operating temperature range for devices by enhancing the durability of the device after high-temperature storage. Further, these techniques reduce capacity degradation of the battery, which enhances long-term performance and sustainability of the battery, provides longer cycle life, and enhances battery longevity.

In a first example, a battery-powered device is exposed to high temperatures for long durations of time while the battery is at a medium-range SOC. In such an example, assume that a battery-powered camera, located in Phoenix, Arizona during summer, is fully charged and placed in a relatively low activity area, which leaves the camera idle for much of the time. At some point, the user takes the camera indoors to charge, which reduces the temperature of the camera's battery and slows battery kinetics. The user plugs in the camera for charging. A battery-manager module detects that (i) the battery has not discharged at long durations at greater than a threshold discharge rate (e.g., a C/50 discharge rate), (ii) the battery SOC is at a medium-range SOC (e.g., between 30% and 80% SOC), and (iii) the battery temperature was on average above a threshold temperature (e.g., at 70° C.) for longer than a threshold amount of time (e.g., more than one week). Due to these conditions, the battery-manager module implements a charging delay and initiates a battery health check. Then, instead of charging the battery immediately, the battery-manager module causes the battery to first discharge at e.g., a C/50 discharge rate for five minutes followed by e.g., a C/5 discharge rate for one minute. The discharge is followed by a pre-charge at e.g., a C/50 charge rate for 30 seconds followed by e.g., a C/5 charge rate for three minutes. After completion of the discharge and pre-charge, the battery-manager module initiates a normal charge profile.

In another example, the battery-powered camera is exposed to high temperatures for long durations of time while the battery is in an idle or low-power state at a low-range SOC. In this instance, the battery-powered camera is located in Phoenix, Arizona (during summer), fully charged, and placed near a moderately high-activity area. Initially, there is significant activity, which drives the battery to less than 30% SOC, and then the family leaves on vacation for two weeks. During this two-week period, the camera is idle for the majority of the time. The family returns home and takes the camera indoors to charge. The battery-manager module detects (i) that the battery has not discharged at long durations at greater than e.g., a C/50 discharge rate, (ii) the battery SOC is less than e.g., 30%, and (iii) the battery temperature was on average at e.g., 67° C. for more than one week. Based on these conditions, the battery-manager module triggers a charging delay and initiates a battery health check. Then the battery-manager module initiates a low-frequency pulse discharge at e.g., 1 hertz (Hz) at a C/50 discharge rate for five minutes, then a high-frequency pulse discharge at e.g., 1 kilohertz (kHz) at a C/5 discharge rate for one minute, followed by a pre-charge at e.g., a C/50 charge rate for 30 seconds and then e.g., a C/5 charge rate for three minutes. After completion of the pulse discharge and the pre-charge, the battery-manager module initiates a normal charge profile.

In yet another example, the battery-powered camera is exposed to high temperatures for long durations of time while the battery is depleted. In this example, the battery-powered camera is placed in a high-activity area having activity that triggers (e.g., via motion detection sensors) operation of the camera such that the battery is depleted to 0% SOC and the camera turns off. The family then leaves for vacation for two weeks without charging the camera. During this two-week period, the camera remains off. The family then returns home, takes the camera indoors, and plugs the camera into a power source for charging. Initially, there is a charging delay because the system powers up with the external power source, but the battery is too low for system boot-up. Moreover, the battery may be in undervoltage protection (UVP) and have zero voltage output. The battery-manager module triggers a battery health check and the system checks to estimate if the battery was likely exposed to high temperatures based on geolocation and location temperature correlation to internal device temperatures (historically or similar devices within close proximity). The battery-manager module detects that (i) the battery has not discharged at long durations at greater than e.g., a C/50 discharge rate, (ii) the battery SOC is at or less than e.g., 0% (e.g., 3.0 Volts (V) to 1.0V range), and (iii) the battery temperature was likely on average at e.g., 71° C. for more than one week. Due to these conditions, the battery-manager module initiates a default pre-charge profile to slowly charge the battery at, e.g., C/50 for 60 seconds or until a UVP threshold is reached and the battery is able to close a discharge field-effect transistor (FET) stably (e.g., where there is no voltage bounce to open it again), and then at, e.g., C/5 for five minutes at >3.0V threshold or where the chemistry transitions from a pre-charge state to a fast-charge state. After the pre-charge sequence, the battery-manager module causes the battery to discharge (e.g., at a C/50 discharge rate for five minutes and then at a C/5 discharge rate for one minute) and then pre-charge (e.g., at a C/50 charge rate for 30 seconds and then a C/5 charge rate for three minutes) prior to entering the normal charge mode at room temperature to charge the battery up to 100% SOC.

While features and concepts of the described techniques for extending battery life after long-term and high-temperature storage can be implemented in any number of different environments, aspects are described in the context of the following examples.

Example Device

FIG. 1 illustrates an example implementation 100 of a battery-powered electronic device in accordance with the techniques described herein. The illustrated example includes an electronic device 102 having a battery 104 that provides power to the electronic device 102. The electronic device 102 also includes a battery-manager module 106, which is configured to monitor and manage the battery 104, including controlling charging events of the battery 104 and monitoring battery health. The battery-manager module 106 is configured to check the battery health and provide notifications (e.g., alerts) when detecting problems with the battery 104. By controlling charging events, the battery-manager module 106 can optimize the charging of the battery 104 to reduce chemistry degradation and ion consumption within the battery 104, thereby extending the life of the battery 104. In aspects, the charging events occur when the electronic device 102 is coupled to an external power source 108 (e.g., outlet, power bank, computing device) that provides electric current to the electronic device 102. The coupling to the external power source 108 may be a wired connection (e.g., cable) or a wireless connection (e.g., using inductive coils).

The battery 104 may be any suitable rechargeable battery. An example battery 104, as is described herein (see FIGS. 2 and 3), is a lithium-ion (Li-ion) battery. Any suitable Li-ion-battery chemistry may be implemented.

The battery-manager module 106 includes a battery-charging manager 110 and a battery-conditions manager 112. The battery-charging manager 110 is configured to create and select pre-charge profiles 114, charge profiles 116, and discharge profiles 118 for charging and discharging the battery 104, respectively. The pre-charge profiles 114 and the charge profiles 116 define charge rates and corresponding time periods for charging the battery 104. Any of the pre-charge profiles 114 and/or the charge profiles 116 may be a step profile that adjusts (e.g., increases, decreases) the charge rate and/or the corresponding time period of each step. The discharge profiles 118 define discharge rates and corresponding time periods for discharging the battery 104. Any of the discharge profiles 118 may be a step profile that adjusts (e.g., increases, decreases) the discharge rate and/or the corresponding time period of each step.

The battery-conditions manager 112 determines battery-usage data 120 over a first time period from a most-recent charging event to when the connection to the external power source 108 is detected (or when a battery-charge request is received). The battery-usage data 120 can indicate a duration of time (e.g., a second time period within the first time period) in which the battery 104 was in an idle state (including an off state) or a low-power state. During the idle state or the low-power state, the electronic device 102 is effectively "stored" rather than "in use."

The battery-conditions manager 112 may also determine temperature data 122 and state-of-charge data 124 (SOC data 124) during the first time period. In another example, the battery-conditions manager 112 may determine the temperature data 122 and the SOC data only during the second time period, which may reduce latency and computational requirements.

The temperature data 122 may include an internal temperature (e.g., historical temperature) of the battery 104 over the first time period or the second time period. The battery-conditions manager 112 may compute a value indicative of an average temperature of the battery 104 over the second time period, which may be used to determine whether the battery 104 was exposed to high temperatures over a prolonged period of time. In some aspects, the temperature data 122 may be estimated based on environmental temperatures in a region corresponding to the location (e.g., geolocation) of the electronic device 102. The environmental temperatures may be obtained from a server over a network (e.g., the network 126).

The SOC data 124 may include a current SOC (e.g., 0%, 2%, 10%, 23%, 30%, 50%, 80%, 98%) of the battery 104 when the electronic device 102 is electrically coupled to the external power source 108. In another example, the current SOC data may represent the SOC of the battery 104 at the time of a charge event (e.g., some time after the external power source 108 is connected to the electronic device 102).

The electronic device 102 may also be configured to communicate with one or more devices or servers over the network 126. By way of example and not limitation, the electronic device 102 may communicate data over a local-area-network (LAN), a wireless local-area-network (WLAN), a personal-area-network (PAN), a wide-area-network (WAN), an intranet, the Internet, a peer-to-peer network, point-to-point network, or a mesh network.

Figure 2:
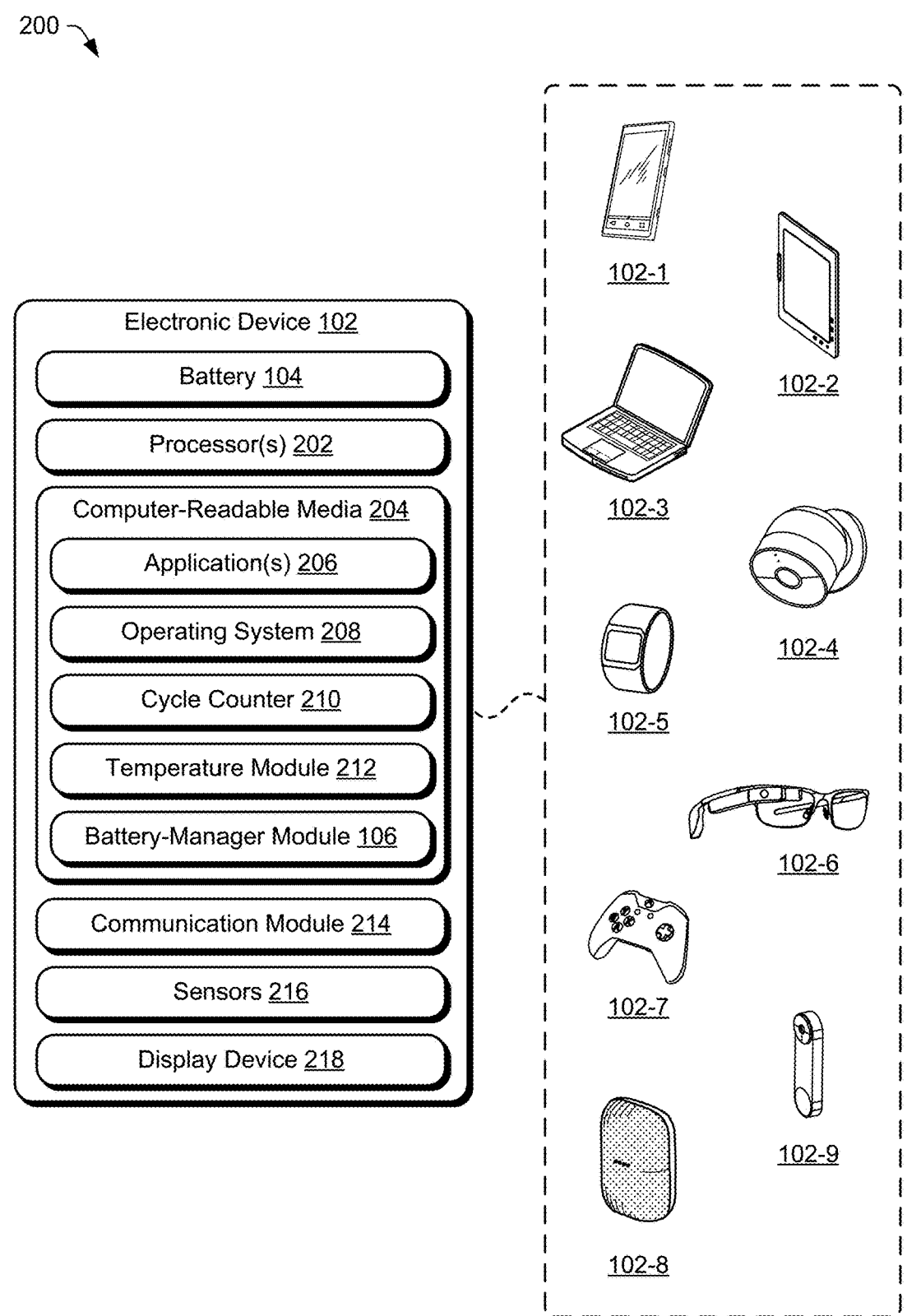
FIG. 2 illustrates an example implementation of the electronic device from FIG. 1 in more detail.

Consider now FIG. 2, which illustrates an example implementation of the electronic device from FIG. 1 in more detail. The electronic device 102 of FIG. 2 is illustrated with a variety of example devices, including a smartphone 102-1, a tablet 102-2, a laptop 102-3, a security camera 102-4, a computing watch 102-5, computing spectacles 102-6, a gaming system 102-7, a video-recording doorbell 102-8, and a speaker 102-9. The electronic device 102 can also include other devices, e.g., televisions, entertainment systems, audio systems, projectors, automobiles, drones, track pads, drawing pads, netbooks, e-readers, home security systems, and other home appliances. Note that the electronic device 102 can be mobile, wearable, non-wearable but mobile, or relatively immobile (e.g., desktops and appliances).

The electronic device 102 includes a battery (e.g., battery 104). The battery 104 may be any suitable rechargeable battery. In an example, the battery 104 may be a Li-ion battery. Various different Li-ion-battery chemistries may be implemented, some examples of which include lithium iron phosphate ($LiFePO_4$), lithium manganese oxide ($LiMn_2O_4$ spinel, or $Li_2MnO_3$-based lithium-rich layered materials, LMR-NMC), and lithium nickel manganese cobalt oxide ($LiNiMnCoO_2$, Li-NMC, LNMC, NMC, or NCM). Many batteries are susceptible to chemistry degradation at higher voltages (e.g., above 80% SOC) and lower voltages (e.g., below 20% SOC). Because of this susceptibility, battery life can be significantly extended if maintained (used and stored) at a medium-range SOC (e.g., between 20% and 80%, including around 50%). Many batteries are also susceptible to thermal events above 60° C., including thermal runaway.

Some batteries, due to their chemistry, can withstand a temperature up to 80° C. before experiencing thermal events. Additional thermal events have been observed when batteries are stored (e.g., at an idle state or a lower power state) for long periods of time within the medium-range SOC at high temperatures (e.g., above 60° C. or above 80° C.). In such circumstances, cells in the battery swell with gas and, in a case, seals may open and an outer Nylon pouch material may thermally decompose.

The electronic device 102 includes one or more processor(s) 202 (e.g., any of microprocessors, controllers, or other controllers) that can process various computer-executable instructions to control the operation of the electronic device 102 and to enable techniques for extending battery life after long-term and high-temperature storage. Alternatively or additionally, the processor(s) 202 can be implemented with any one or combination of hardware elements, firmware, or fixed logic circuitry that is implemented in connection with processing and control circuits. Although not shown, the electronic device 102 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The electronic device 102 also includes computer-readable media (CRM) 204, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewritable compact disc (CD), any type of a digital versatile disc (DVD).

The computer-readable media 204 provides data storage mechanisms to store various device applications 206, an operating system 208, memory/storage, and other types of information and/or data related to operational aspects of the electronic device 102. For example, the operating system 208 can be maintained as a computer application within the computer-readable media 204 and executed by the processor(s) 202 to provide some or all of the functionalities described herein. The device applications 206 may include a device manager, such as any form of a control application, software application, or signal-processing and control modules. The device applications 206 may also include system components, engines, or managers to implement techniques for extending battery life after long-term and high-temperature storage, such as the battery-manager module 106. The electronic device 102 may also include, or have access to, one or more machine learning systems.

The CRM 204 may also include a cycle counter 210 and a temperature module 212 in addition to the battery-manager module 106. The cycle counter 210 tracks a quantity of charge-discharge cycles of the battery 104. The cycle counter 210 may also account for partial cycles, such as when the battery 104 is not fully discharged before beginning to charge or when the battery 104 is not fully charged before beginning to discharge. The cycle counter 210 may also track when a charge event (e.g., charging of the battery 104) occurs and provide an indication of when a most-recent charge event occurred. Such an indication may be used to determine a length of time between two charge events, including between a current charge event and the most-recent charge event.

The temperature module 212 determines the temperature of the battery 104. In aspects, the temperature module 212 monitors the temperature of the battery 104 over time to provide temperature data 122 (e.g., the temperature data 122 in FIG. 1). The temperature data 122 can be used to determine the temperature of the battery 104 over the length of time between the two charge events. Further, the temperature data 122 is used to determine whether the battery 104 was exposed to high temperatures while the battery 104 was in the idle state or the low-power state over a long period of time (e.g., period of time greater than a time threshold).

The temperature module 212 may also estimate temperatures that the battery 104 is likely to have been exposed to during an off state of the electronic device 102. For example, the temperature module 212 can use weather information (e.g., weather information, obtained from a server, for a geographical region (e.g., locale, location, area, city) corresponding to the location of the electronic device 102), combined with historical temperature data of the electronic device 102, to estimate (e.g., extrapolate) temperatures that the battery 104 was likely exposed to during the off state. If, for instance, the battery temperature typically reaches e.g., 70° C. when the ambient temperature is around 40° C., then the temperature module 212 can estimate that, given an ambient temperature of 40° C. when the battery is in an off state, the battery temperature was likely around 70° C. The estimated battery temperature can be determined in any suitable way, including algorithmically or using a lookup table.

Various implementations of the battery-manager module 106 can include, or communicate with, a System-on-Chip (SoC), one or more Integrated Circuits (ICs), a processor with embedded processor instructions or configured to access processor instructions stored in memory, hardware with embedded firmware, a printed circuit board with various hardware components, or any combination thereof.

The electronic device 102 may also include a communication module 214 (e.g., network interface). The electronic device 102 can use the communication module 214 for communicating data over wired, wireless, or optical networks (e.g., the network 126). By way of example and not limitation, the communication module 214 may communicate data over a local-area-network (LAN), a wireless local-area-network (WLAN), a personal-area-network (PAN), a wide-area-network (WAN), an intranet, the Internet, a peer-to-peer network, point-to-point network, or a mesh network. The communication module 214 can be implemented as one or more of a serial and/or parallel interface, a wireless interface, any type of network interface, a modem, or any other type of communication interface. Using the communication module 214, the electronic device 102 may communicate via a cloud computing service (e.g., the network 126) to access a platform having resources. In some aspects, the electronic device 102 may use the communication module 214 to retrieve software updates to enable the battery-manager module 106 to be updated and/or implemented on the electronic device 102.

The electronic device 102 also includes one or more sensors 216, which can include any of a variety of sensors, including an audio sensor (e.g., a microphone), a touch-input sensor (e.g., a touchscreen, a fingerprint sensor, a capacitive touch sensor), an image-capture device (e.g., a camera or video-camera), proximity sensors (e.g., capacitive sensors), or an ambient light sensor (e.g., photodetector).

The electronic device 102 can also include a display device (e.g., display device 218). The display device 218 can include any suitable touch-sensitive display device, e.g., a touchscreen, a liquid crystal display (LCD), thin film transistor (TFT) LCD, an in-place switching (IPS) LCD, a capacitive touchscreen display, an organic light-emitting diode (OLED) display, an active-matrix organic light-emitting diode (AMOLED) display, super AMOLED display, and so forth. The display device 218 may be referred to as a display or a screen, such that digital content may be displayed on-screen.

Although not shown, the electronic device 102 also includes I/O interfaces for receiving and providing data. For example, the I/O interfaces may include one or more of a touch-sensitive input, a capacitive button, a microphone, a keyboard, a mouse, an accelerometer, a display, a light-emitting diode (LED) indicator, a speaker, or a haptic feedback device.

Further to the descriptions above, a user may be provided with controls allowing the user to make an election as to both if and when systems, programs, or features described herein may enable collection of user information (e.g., information about a user's social network, social actions or activities, profession, a user's preferences, a user's current location, a user's calendar schedule, or a user's scheduled activities), and if the user is sent content or communications from a server. In addition, certain data may be treated in one or more ways before it is stored or used so that personally identifiable information is removed. For example, a user's identity may be treated so that no personally identifiable information can be determined for the user, or a user's geographic location may be generalized where location information is obtained (such as to a city, ZIP code, or state level) so that a particular location of a user cannot be determined. Thus, the user may have control over what information is collected about the user, how that information is used, and what information is provided to the user.

These and other capabilities and configurations, as well as ways in which entities of FIGS. 1 and 2 act and interact, are set forth in greater detail below. These entities may be further divided, combined, and so on. The implementation 100 of FIG. 1 and the detailed illustrations of FIG. 2 through FIG. 9 illustrate some of many possible environments, devices, and methods capable of employing the described techniques, whether individually or in combination with one another.

Figure 3:
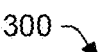
FIG. 3 illustrates an example basic structure of a lithium-ion battery.
Figure 3:
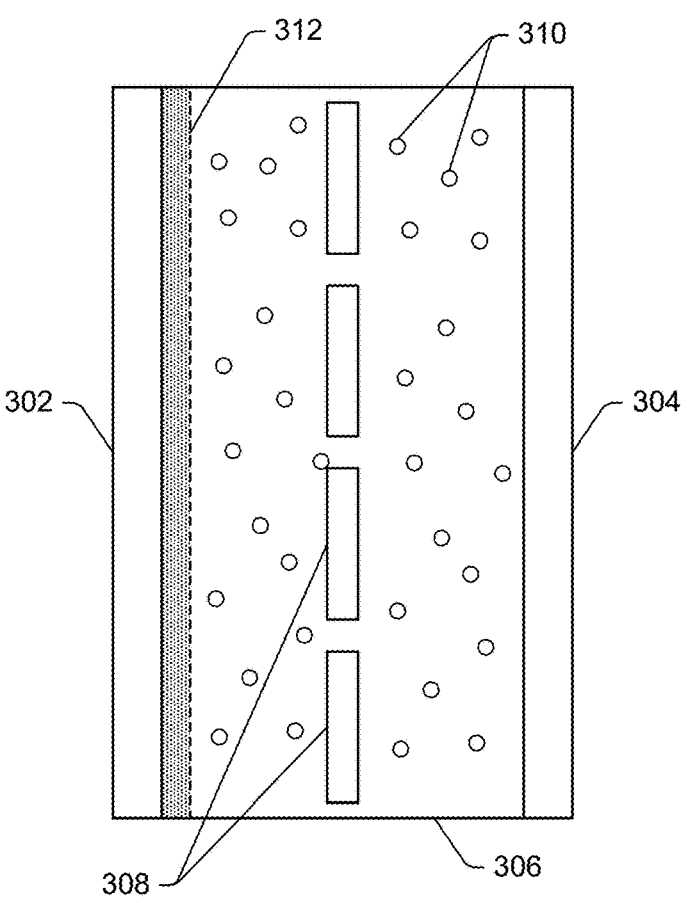

FIG. 3 illustrates an example basic structure 300 of a lithium-ion battery. The battery 104 includes an anode 302 (e.g., graphite) and a cathode 304 (e.g., metal oxide) separated by an electrolyte solution 306 (e.g., lithium salt in organic solvent) and a porous separator 308 (e.g., polyethylene film, polypropylene film). Lithium ions 310 move through the electrolyte 306 when discharging and/or charging the battery 104. Under storage, a solid electrolyte interphase (SEI) layer 312 grows on the anode 302. Over time, the SEI layer 312 begins to establish equilibrium and begins to grow onto the anode 302, which reduces the capacity of the battery 104 by preventing Li-ions from intercalating into the anode 302. As described herein, a discharge/charge sequence of the battery 104 can be manipulated to accommodate for the timing associated with the SEI layer.

Figure 4:
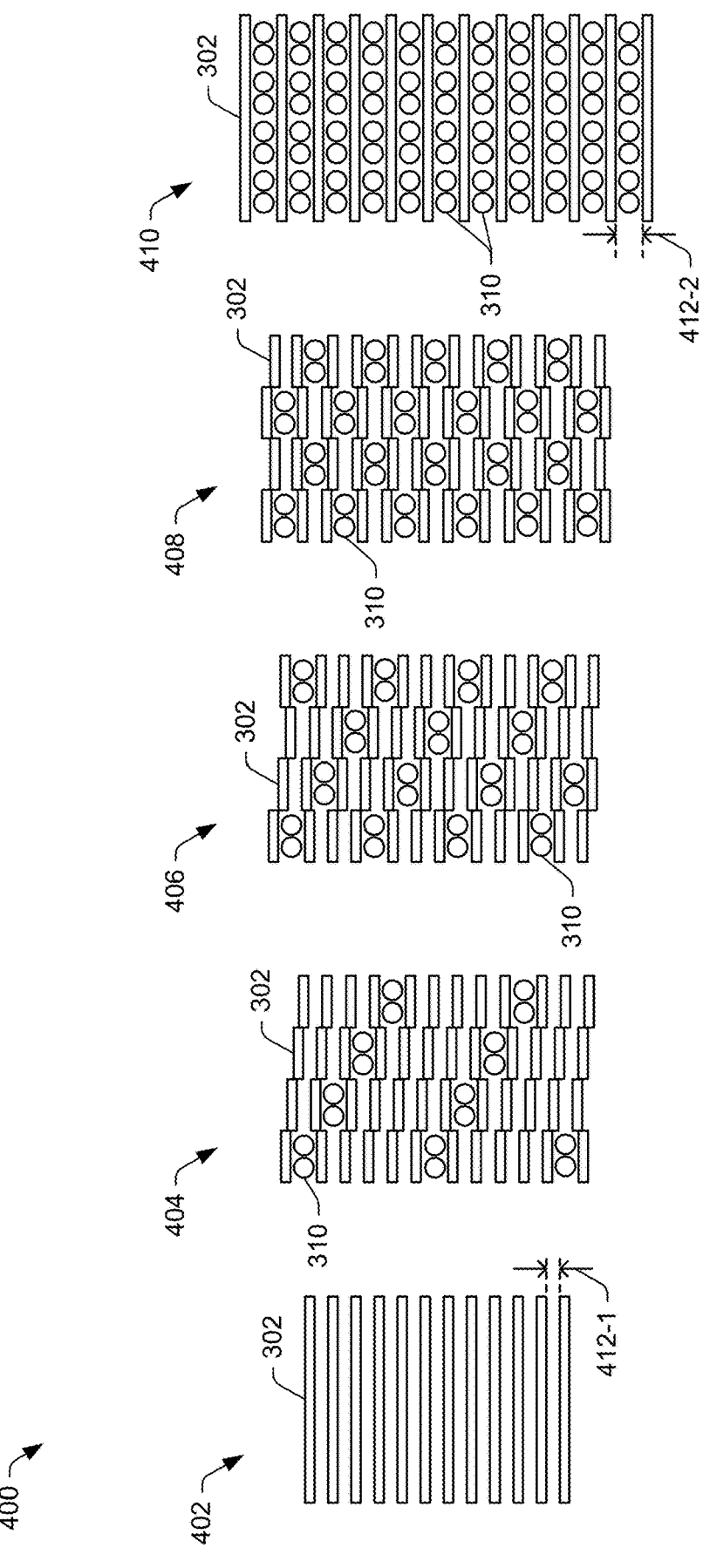
FIG. 4 illustrates an example implementation of graphite-anode-material charge/discharge kinetics of a Li-ion battery.

FIG. 4 illustrates an example implementation 400 of graphite-anode-material charge/discharge kinetics of a Li-ion battery. Generally, a Li-ion battery includes a graphite layered structure (e.g., the anode 302). In the illustrated example, the graphite layered structure is shown in various stages of charge (e.g., stage-1 402, stage-2 404, stage-3 406, stage-4 408, stage-5 410). Stage-1 402 represents a fully discharged battery (e.g., low SOC) where the graphite layered structure (e.g., the anode 302) is substantially empty of lithium. At the other end, stage-5 410 represents a fully charged battery (e.g., high SOC) where the graphite layered structure is filled with lithium. Stage-3 406 represents a medium SOC (e.g., around a 50% charge), where the graphite layered structure is half-filled with lithium.

As illustrated, at medium-range and low-range SOCs, the graphite structure is more closed versus a more-open graphite structure at higher SOCs. For example, a distance 412-1 between graphite layers in medium and lower SOCs is less than a distance 412-2 between graphite layers at higher SOCs. Hence, after longer-term high-temperature storage and subsequent charge at room temperature, the anode/graphite surface, having an SEI layer (e.g., the SEI layer 312 from FIG. 3), and structure need time to relax and refresh before beginning a "normal" charge profile. The methodology of relaxing and refreshing the anode/graphite surface, after high-temperature storage, is through distinct and tailored discharges occurring before a normal charge profile, as described herein.

Figure 5:
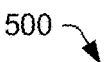
FIG. 5 illustrates an example implementation of the battery-manager module from FIG. 1 in more detail.
Figure 5:
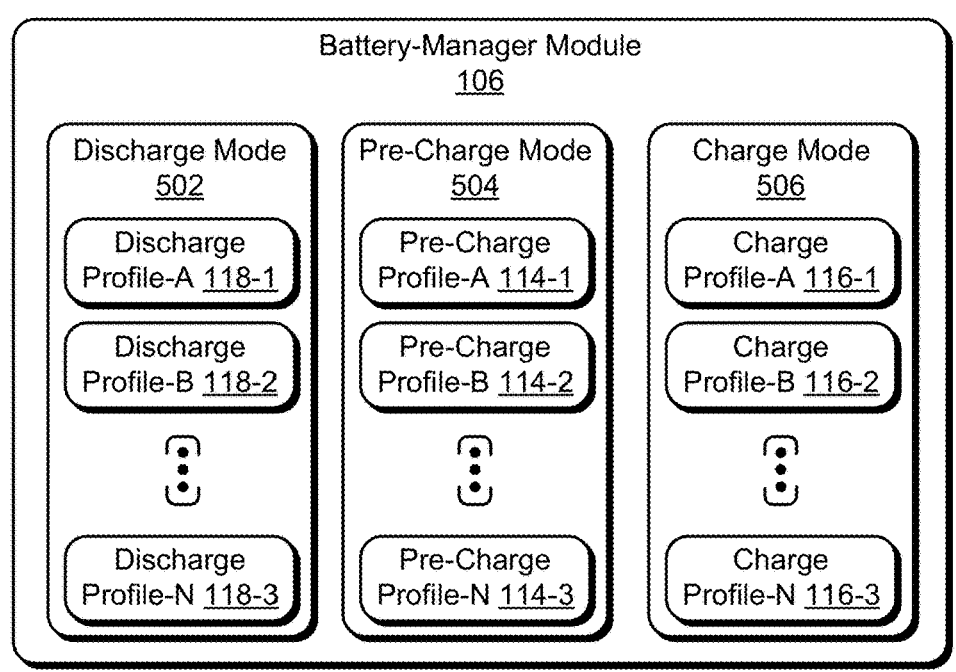

FIG. 5 illustrates an example implementation 500 of the battery-manager module 106 from FIG. 1 in more detail. The battery-manager module 106 controls charging operations of the battery 104 of the electronic device 102. In aspects, the battery-manager module 106 switches between a discharge mode 502, a pre-charge mode 504, and/or a charge mode 506 when initiating a charge event of the battery 104.

The discharge mode 502 includes a plurality of discharge profiles 118 (e.g., discharge profile-A 118-1, discharge profile-B 118-2, . . . , discharge profile-N 118-3). The discharge mode 502 is selected and applied to discharge the battery 104. A discharge profile 118 is selected to define at least one discharge rate and corresponding duration of time for discharging the battery 104 at that discharge rate. In some aspects, the discharge profile 118 defines a sequence of discharge rates and corresponding time periods, such that application of the discharge profile 118 applies the discharge rates sequentially according to the corresponding time periods. The discharge profile 118 may be a step profile, stepping from one discharge rate to a next discharge rate. A particular discharge profile 118 may be selected based on battery conditions (e.g., SOC, usage, high-temperature exposure, current temperature) determined by the battery-conditions manager 112 from FIG. 1. In this way, the discharge profile 118 is selectable to tailor the discharges to the current conditions of the battery 104.

In operation, the discharge profile 118 first initiates a slow discharge rate for a first predefined amount of time and then increases (e.g., steps up) the discharge rate to a faster rate for a second predefined amount of time. Any suitable discharge rate may be used. In one example, the discharge profile 118 starts at a C/50 discharge rate for five minutes and then steps (or ramps) up to C/5 discharge rate for one minute.

The pre-charge mode 504 includes a plurality of pre-charge profiles 114 (e.g., pre-charge profile-A 114-1, pre-charge profile-B 114-2, . . . , pre-charge profile-N 114-3). The pre-charge profiles initiate a slow charge rate for a first amount of time and then can step up the charge rate to an increased charge rate for a second amount of time. Typically, the pre-charge mode 504 is applied after the discharge mode 502 and prior to the charge mode 506. Any suitable charge rate may be used, which is significantly slower than a normal charge rate. In an example, the pre-charge profile 114 may mirror the previously applied discharge profile 118 (e.g., the pre-charge profile 114 may define the same rate(s) and time(s) as the discharge profile 118 but for charging rather than discharging the battery 104). However, the selected pre-charge profile 114 may define charge rates that are different from the discharge rates defined by the selected discharge profile 118. In one example, a pre-charge profile 114 is selected that defines a first pre-charge rate of C/50 for 30 seconds and a second pre-charge rate of C/5 for three minutes.

The charge mode 506 includes a plurality of charge profiles 116 (e.g., charge profile-A 116-1, charge profile-B 116-2, . . . , charge profile-N 116-3). The charge profiles 116 define "normal" charge profiles, which may be industry-standard charge rates. Typical normal charge profiles may include fast charge rates, which may step down as the battery approaches a full charge. An example normal charge profile 116 may charge at a 3C charge rate and then step down to a 2C charge rate, then to a 1C charge rate, then to a C/2 charge rate as the device slowly starts to match the voltage and equilibrate the polarization.

Example Methods

Figure 6:
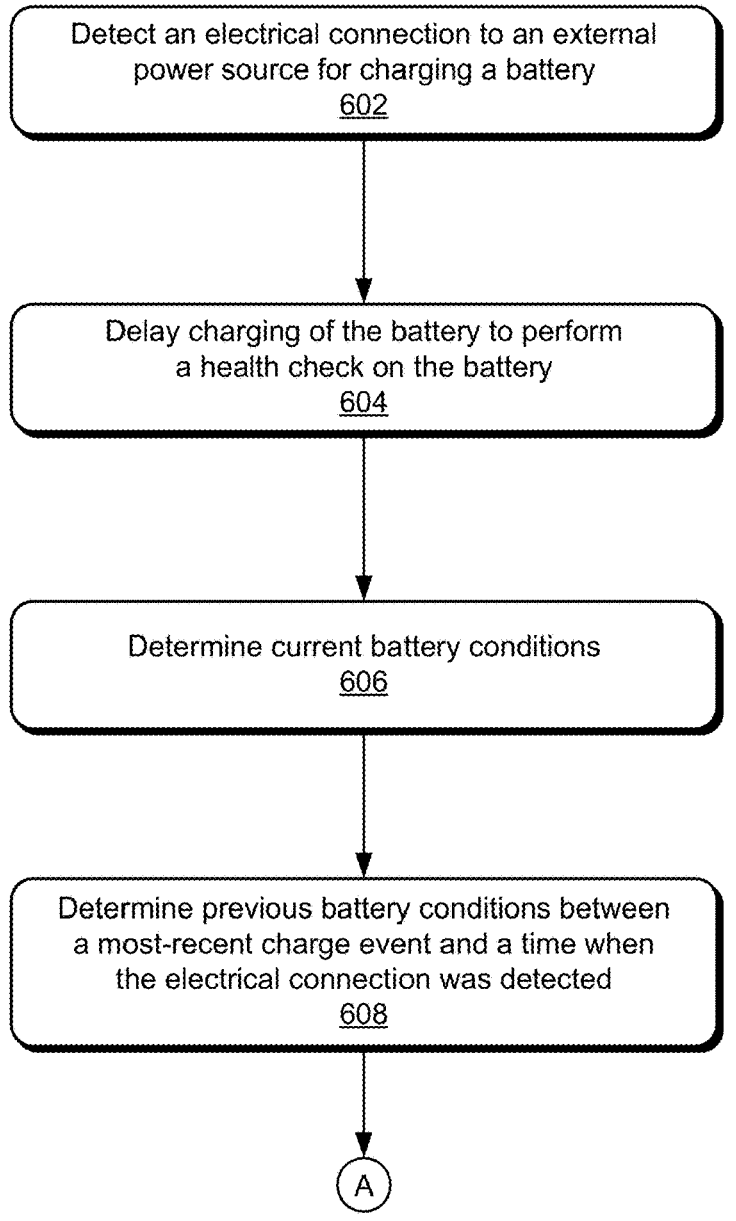
FIGS. 6-8 depict example methods for extending battery life after long-term and high-temperature storage.
Figure 7:
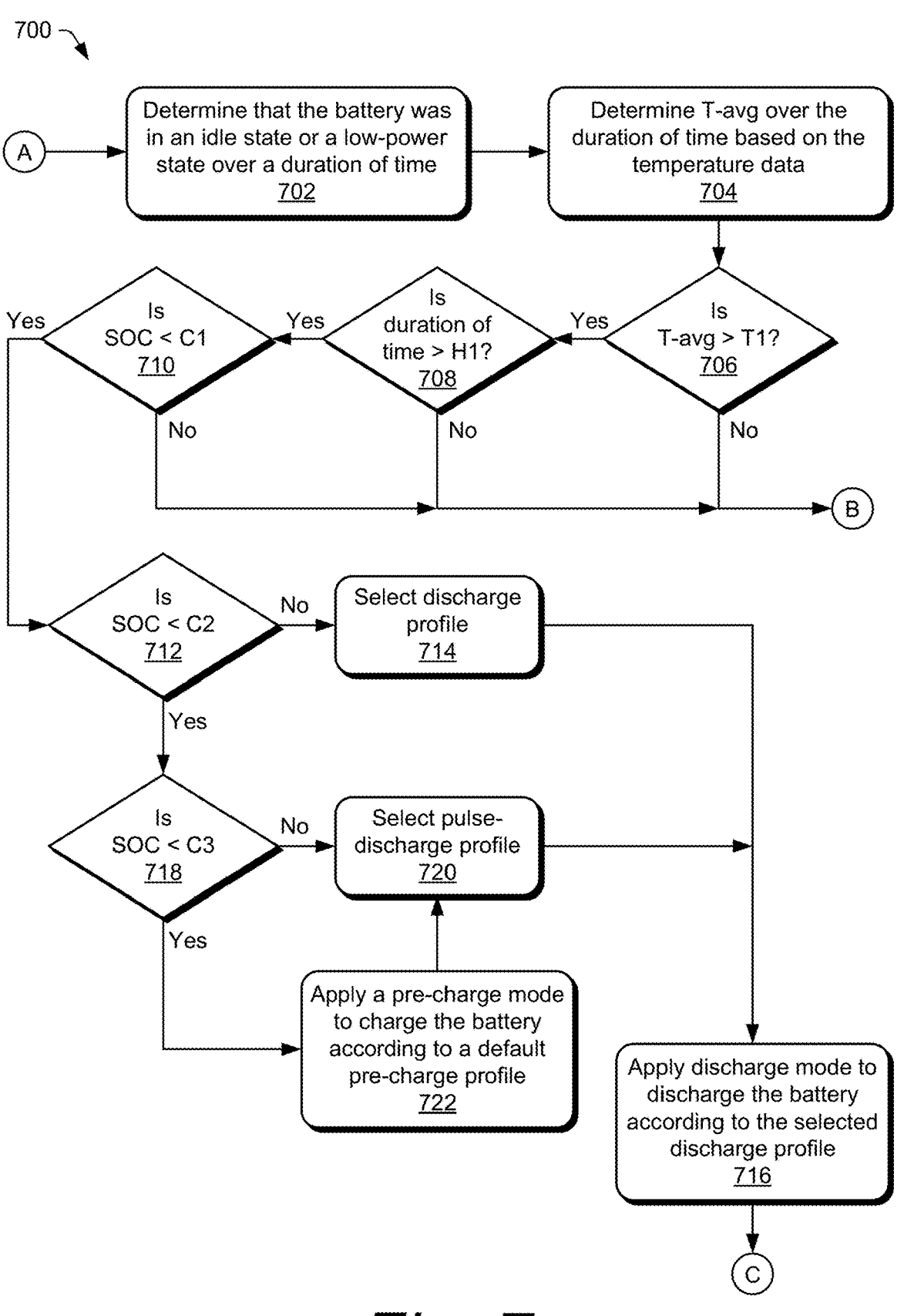
Figure 8:
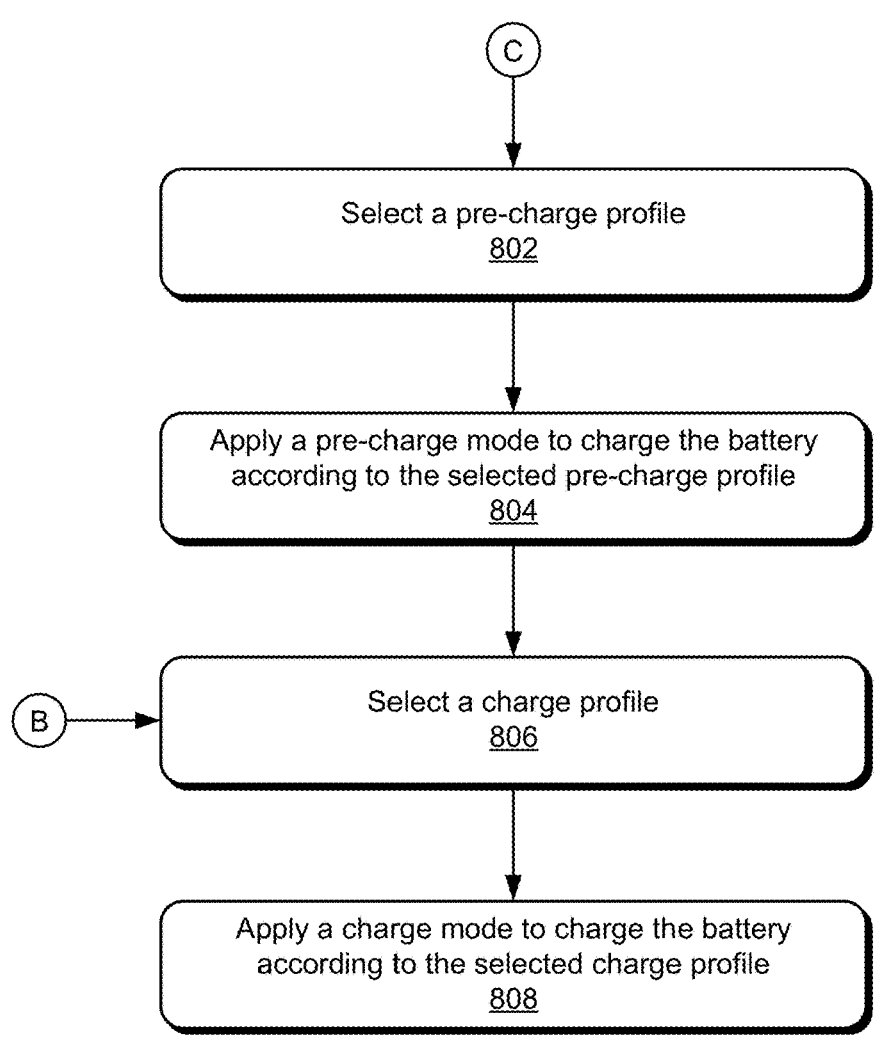

FIGS. 6, 7, and 8 depict example methods 600, 700, and 800, respectively, for extending battery life after long-term and high-temperature storage. The methods 600, 700, and 800 can be performed by the electronic device 102, which uses the battery-manager module 106 to apply a battery-longevity technique to relax and refresh the anode surface of the battery 104, after long-term and high-temperature storage, prior to charging the battery 104 according to a normal charge profile. The methods 600, 700, and 800 collectively provide enhanced safety, reliability, performance, and sustainability/longevity for the battery 104 and electronic device 102. The methods 600 and 800 are supplemental to, and are optionally performed in conjunction with, the method 700.

The methods 600, 700, and 800 are shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example implementation 100 of FIG. 1 or to entities or processes as detailed in FIGS. 2-5, reference to which is made for example only. The techniques are not limited to performance by one entity or multiple entities operating on one device.

At 602, an electrical connection to an external power source for charging a battery is detected. For example, the battery-manager module 106 detects that the electronic device 102 has been plugged into a power source (e.g., an outlet, a power bank, another electronic device). In aspects, the detection is based on a request to charge the battery 104 that is received from another component of the electronic device 102. The detection can also, or alternatively, be based on a rise in voltage and/or current being provided to the battery 104 from an external power source (e.g., the external power source 108).

At 604, charging of the battery is delayed to perform a health check on the battery. For example, the battery-manager module 106 delays the charging of the battery 104 and requests or initiates a battery-health check.

At 606, current battery conditions are determined. For example, the battery-manager module 106 communicates with the battery-conditions manager 112 to perform the battery-health check and determine the current battery conditions. The battery-health check can include measuring or detecting the current SOC of the battery 104 as well as a current temperature of the battery 104.

At 608, previous battery conditions are determined between a most-recent charge event and a present time (e.g., when the electrical connection is detected). In an example, the battery-conditions manager 112 frequently determines usage (e.g., operational state), SOC, temperature of the battery 104, and a corresponding timestamp, and stores this information in a memory (e.g., buffer, storage media, memory media, cache) in raw form. Using this raw data, the battery-conditions manager 112 (or the battery-manager module 106) can obtain information regarding whether the battery 104 was subject to high temperatures for a relatively long duration of time during an idle state or low-power state between a most-recent charge event and the present time. The method 600 then proceeds to "A," which leads to 702 in FIG. 7.

FIG. 7 depicts a method 700 for extending battery life after long-term and high-temperature storage. At 702, the battery is determined to have been in an idle state or a low-power state over a duration of time within the time period between the most-recent charge event and the present time. For example, the battery-manager module 106 determines that the battery 104 has not discharged at long durations (e.g., more than a threshold amount of time) at greater than a threshold discharge rate over the duration of time. The threshold discharge rate defines a maximum discharge rate at which the battery 104 is considered to still be "idle" or "low power." Alternatively, the threshold discharge rate defines a minimum discharge rate at which the battery 104 is considered to still be "in use." Effectively, the battery 104 is being "stored" if the battery 104 does not discharge at a rate greater than the threshold discharge rate.

At 704, a value indicative of an average temperature (T-avg) of the battery is determined over the duration of time based on the temperature data. For example, the battery-manager module 106 utilizes the temperature data 122 obtained by the battery-conditions manager 112 to determine the average temperature T-avg of the battery throughout the duration of time. In some aspects, such as when the battery 104 is at or below 0% SOC, the temperature data may not be available. In such a case, the battery-conditions manager 112 may communicate, using the communication module 214, with an online resource (e.g., a server, weather service) via the network 126 to obtain local weather information (based on the device's geolocation) that occurred during the duration of time. The weather information (e.g., hourly local temperatures) can be used to estimate the average battery temperature over the duration of time. This estimated average battery temperature is used to determine whether the battery 104 was likely exposed to high temperatures during the time in which the battery was depleted and not discharging at a rate greater than the threshold discharge rate, effectively remaining in an idle state (or an off state).

At 706, the battery-manager module 106 determines whether the value indicative of the average temperature T-avg of the battery over the duration of time was above a temperature threshold T1. The temperature threshold T1 defines a minimum temperature considered to be a "high temperature" for the battery 104. Alternatively, the temperature threshold T1 may define a maximum temperature of an acceptable range of temperatures considered to be "safe" for the battery 104. For many batteries, the temperature threshold T1 may be 60° C. If the average temperature T-avg over the duration of time was not greater than the temperature threshold T1 ("NO" at 706), then the method 700 proceeds to "B," which leads to 806 in FIG. 8 where a normal charge profile is applied. However, if the average temperature of the battery 104 over the duration of time was greater than the temperature threshold T1 ("YES" at 706), then the method proceeds to 708.

At 708, the battery-manager module 106 determines whether the duration of time is greater than a threshold length of time H1 that defines a "long duration." Any suitable threshold length of time H1 may be used. In an example, the threshold length of time is approximately one week. In another example, the threshold length of time may be approximately two weeks. In aspects, the threshold length of time H1 may be dependent on the average temperature of the battery such that a higher temperature may correspond to a shorter length of time and a lower temperature may correspond to a greater length of time. In one example, the threshold length of time H1 may be one week for an average temperature of 70° C. In another example, the threshold length of time H1 may be two weeks for an average temperature of 61° C.

If the duration of time (e.g., the amount of time for which the battery 104 was in an idle state or a low-power state and, at this point, the temperature was on average greater than the temperature threshold 77) is not greater than the threshold length of time H1 ("NO" at 708), then the method 700 proceeds to "B," which leads to 806 in FIG. 8 where a normal charge profile is applied. If, however, the duration of time is greater than the threshold length of time H1 ("YES" at 708), then the method proceeds to 710.

At 710, the battery-manager module 106 determines if the current SOC of the battery is less than a first threshold level SOC C1 (e.g., 80%). If the current SOC is at or greater than the first threshold level SOC C1 ("NO" at 710), then the method 700 proceeds to "B," which leads to 806 in FIG. 8 where a normal charge profile is applied. If, however, the current SOC is less than the first threshold level SOC C1 ("YES" at 710), then the method proceeds to 712.

At 712, the battery-manager module 106 determines if the SOC is less than a second threshold level SOC C2 (e.g., 30%). If the SOC is at or greater than the second threshold level SOC C2 ("NO" at 712), then the battery-manager module 106 determines that the SOC is at a medium-range SOC (e.g., between 30% and 80% SOC) and the method proceeds to 714.

At 714, the battery-manager module 106 selects a discharge profile from a plurality of discharge profiles (e.g., discharge profiles 118 in FIG. 5). In an example, the battery-manager module 106 selects a particular discharge profile based on the current battery conditions (e.g., current SOC, current temperature).

At 716, the battery-manager module 106 applies the discharge mode 502 to discharge the battery 104 according to the selected discharge profile 118. Although the electronic device 102 is electrically connected to the external power source 108, the battery-manager module 106, based on the conditions described above, first discharges the battery 104. Any suitable manner of discharging the battery 104 may be utilized, including e.g., causing the processor(s) 202 to spin or execute commands in a queue, causing an application to perform clean-up tasks, illuminating or increasing a brightness of the display device 218, playing an audio recording, etc. The discharge occurs at a slow discharge rate defined by the selected discharge profile 118 and may step (or ramp) up to one or more greater discharge rates. This discharge prior to charging enables the anode structure of the battery 104 to relax and refresh before beginning a normal charge profile.

After completion of the discharge mode according to the discharge rate(s) and time(s) defined by the selected discharge profile, the method 600 proceeds to "C," which leads to 802 of FIG. 8.

If, at 712, the SOC is less than the second threshold level SOC C2 ("YES" at 712), then the method proceeds to 718. At 718, the battery-manager module 106 determines if the SOC is less than a third threshold level SOC C3 (e.g., 0% SOC). If the current SOC is greater than the third threshold level SOC C3 ("NO" at 718), then the battery-manager module 106 determines that the battery is currently at a low-range SOC (e.g., between 0% and 30% SOC) and the method proceeds to 720.

At 720, the battery-manager module 106 selects a pulse-discharge profile from the plurality of discharge profiles (e.g., discharge profiles 118 in FIG. 5). In an example, the battery-manager module 106 selects a particular pulse-discharge profile based on the current battery conditions (e.g., current SOC, current temperature). The selected pulse-discharge profile discharges a relatively small amount of energy to relax and refresh the anode surface of the battery, in comparison to other discharge profiles, such as a direct current (DC) discharge profile. After selecting the pulse-discharge profile, the method proceeds to 716 to apply the discharge mode according to the selected discharge profile (e.g., the pulse-discharge profile).

The pulse discharge (also referred to as alternating current (AC) discharge) can be defined or modified based on frequency, and/or combing its pulses with a DC discharge. In an example, a frequency greater than approximately 1 Hz can be considered within the AC time domain and a frequency at or less than approximately 1 Hz can be considered as DC, when considering a traditional frequency response profile. The discharge profile 118 can define the frequency (e.g., a frequency greater than 1 Hz) for specific durations (e.g., one second on, one second off, two seconds on, one second off). The discharge profile 118 can also, or alternatively, define different frequencies at different time domains for discharging the battery using AC. For example, the discharge profile 118 may define a low-frequency pulse discharge at e.g., 1 Hz at C/50 discharge rate for four minutes followed by a high-frequency pulse discharge at e.g., 1 kHz at C/5 discharge rate for 35 seconds. The pulse discharge uses a relatively small amount of energy to effectively relax and refresh the SEI layer on the anode surface, in comparison to a DC discharge.

If, at 718, the SOC of the battery is at or below the third threshold level SOC C3 ("NO" at 718), then at 722, a pre-charge mode is applied to slowly charge the battery according to a default pre-charge profile. Generally, the battery 104 may not be able to discharge if the SOC is at or below 0%. Accordingly, a pre-charge profile (default or pre-selected) is applied to slowly charge the battery 104 at a charge rate that is significantly less than a normal charge rate. In one example, the pre-charge profile is a step profile defining a charge rate of C/50 for 60 seconds followed by a charge rate of C/5 for five minutes. Pre-charging the battery 104 in this way partially fills the anode structure without causing plating to occur. Then, after completion of the pre-charge mode according to the default pre-charge profile, which only partially charges the battery 104, the method proceeds to discharge the battery 104 by selecting (at 720) a pulse-discharge profile and applying (at 716) the discharge mode according to the selected discharge profile (e.g., the pulse-discharge profile) to relax and refresh the anode surface of the battery 104.

At 802 in FIG. 8, the battery-manager module 106 selects a pre-charge profile 114 to pre-charge the battery 104 prior to applying a normal charge profile. The pre-charge profile defines one or more slow-charge rates and corresponding durations of time to apply the slow-charge rates. In one example, the pre-charge profile 114 defines a first slow-charge rate of C/50 for 30 seconds and a second slow-charge rate of C/5 for three minutes. Slowly charging the battery 104 prior to applying a normal fast charge enables the battery 104 to safely ramp up to the fast charge without damaging the battery 104.

At 804, the battery-manager module 106 applies the pre-charge mode 504 to charge the battery 104 according to the selected pre-charge profile 114. After completion of the pre-charge mode 504 according to the selected pre-charge profile 114, the method proceeds to 806 to begin a normal fast charge.

At 806, the battery-manager module 106 selects a charge profile. In an example, the charge profile 116 may be selected from a plurality of charge profiles 116 based on the current battery conditions of the battery 104. For example, if the battery 104 has a low SOC (e.g., <30%), then the battery-manager module 106 may select a charge profile 116 that defines a fast charge (e.g., a 3C charge rate). In another example, if the battery 104 has a medium SOC (e.g., greater than 30% and less than 80%), then the battery-manager module 106 may select a charge profile 116 that defines a less-aggressive charge (e.g., 1C).

At 808, a charge mode is applied to charge the battery according to the selected charge profile. For example, the battery-manager module 106 applies the charge mode 506 to charge the battery 104 according to the selected charge profile 116.

Figure 9:
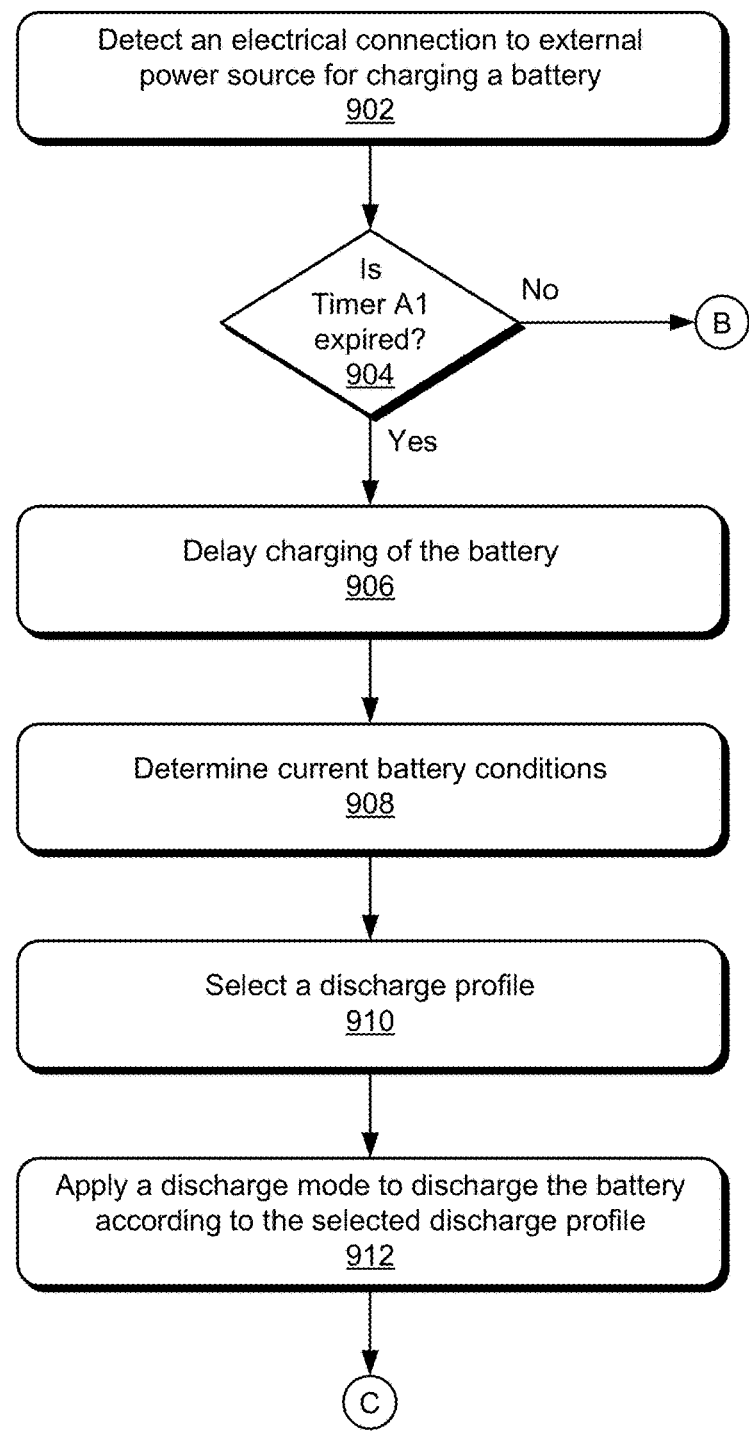
FIG. 9 depicts a method for generally relaxing and refreshing the anode surface of the battery of the electronic device prior to charging the battery.

FIG. 9 depicts a method 900 for generally relaxing and refreshing the anode surface of the battery of the electronic device prior to charging the battery. The method 900 can be performed by the electronic device 102, which uses the battery-manager module 106 to apply a battery-longevity technique to relax and refresh the anode surface of the battery 104 prior to charging the battery 104 at a normal rate. The method 800 (in FIG. 8) is supplemental to, and is optionally performed in conjunction with, the method 900. The method 900 (combined with method 800) provides enhanced safety, reliability, performance, and sustainability/ longevity of the battery 104 and electronic device 102.

The method 900 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example implementation 100 of FIG. 1 or to entities or processes as detailed in FIGS. 2-5, reference to which is made for example only. The techniques are not limited to performance by one entity or multiple entities operating on one device.

In the method 900, the battery 104 can be relaxed and refreshed regardless of the previous battery conditions that occurred since the most-recent charging event. Rather, the discharge mode may be applied automatically upon detection of the connection to the external power source. In another example, the method 900 may be triggered after a timer expires (e.g., three years). In aspects, the timer may correspond to an age of the battery 104 and may be used to indicate an age for which the battery 104 is likely to begin losing capacity due to e.g., SEI plating and/or Li-ion consumption. The timer may expire prior to a time when battery degradation is likely to begin due to age. In this way, the method 900 is implemented to extend the life of the battery 104 regardless of the previous battery conditions.

At 902, an electrical connection to an external power source for charging a battery is detected. For example, the battery-manager module 106 detects that the electronic device 102 is coupled to the external power source 108. Alternatively, the battery-manager module 106 may receive an indication of the electrical connection to the external power source from another component of the electronic device 102.

At 904, the battery-manager module 106 determines if a timer A1 is expired. The timer A1 may be set to expire at, or prior to, an age of the battery 104 when battery degradation is expected to begin. If the timer A1 is not expired ("NO" at 904), then the method 900 proceeds to "B," which leads to 806 in FIG. 8 to implement (e.g., select (at 806) and apply (at 808)) a normal charge profile. If the timer A1 is expired ("YES" at 904), then the method 900 proceeds to 906.

At 906, charging of the battery is delayed. For example, the battery-manager module 106 delays the charging of the battery 104 to enable relaxing and refreshing of the anode surface of the battery 104.

At 908, current battery conditions are determined. For example, the battery-manager module 106 communicates with the battery-conditions manager 112 to determine the current battery conditions. The current battery conditions may include e.g., the current SOC of the battery 104, a current temperature of the battery 104, and so forth.

At 910, a discharge profile is selected. For example, the battery-manager module 106 selects a discharge profile from a plurality of discharge profiles (e.g., discharge profiles 118 in FIG. 5). The battery-manager module 106 may select a particular discharge profile based on the current battery conditions (e.g., current SOC, current temperature).

At 912, the discharge mode is applied to discharge the battery according to the selected discharge profile. For example, the battery-manager module 106 applies the discharge mode 502 to discharge the battery 104 according to the selected discharge profile 118. The method 900 then proceeds to "C," which leads to the method 800 in FIG. 8 for pre-charging and charging the battery 104 according to a selected pre-charge profile and a selected charge profile, respectively.

Some examples are described below:

Example 1. A method performed by an electronic device, the method comprising: detecting an electrical connection to an external power source for charging a battery of the electronic device; in response to the detecting, delaying the charging of the battery; determining one or more current battery conditions; determining previous battery conditions of the battery between a most-recent charge event and a time of the detecting of the electrical connection to the external power source, the previous battery conditions including temperature data of the battery and battery-usage data, the battery-usage data indicating that the battery has been in an idle state or a low-power state over a duration of time; determining a value indicative of an average temperature of the battery over the duration of time based on the temperature data; based on the one or more current battery conditions, the duration of time being greater than a time threshold, and the value indicative of the average temperature being greater than a temperature threshold, applying a discharge mode prior to initiating a charge mode for the battery, the discharge mode configured to cause the battery to be discharged according to at least one of a plurality of discharge profiles to relax and refresh an anode structure of the battery; and after completion of the discharge mode, applying the charge mode to cause the battery to be charged according to at least one of a plurality of charge profiles.

Example 2. The method of example 1, wherein the plurality of discharge profiles includes a first discharge profile configured to cause the electronic device to discharge the battery at a first discharge rate over a first predefined time period.

Example 3. The method of example 2, wherein the first discharge profile is a step profile having multiple discharge rates each having a corresponding time period.

Example 4. The method of example 3, wherein the multiple discharge rates of the first discharge profile are applied sequentially according to the corresponding time periods.

Example 5. The method of any one of examples 2 to 4, wherein: the one or more current battery conditions include a current state-of-charge of the battery; the method further comprises selecting the first discharge profile from the plurality of discharge profiles based on the current state-of-charge being below a threshold level state-of-charge; and the applying of the discharge mode includes applying the discharge mode according to the first discharge profile.

Example 6. The method of any one of example 5, wherein the threshold level state-of-charge defines a range between 80% state-of-charge and 30% state-of-charge.

Example 7. The method of any one of examples 2 to 4, wherein: the plurality of discharge profiles includes a second discharge profile that is different from the first discharge profile; the one or more current battery conditions include a current state-of-charge of the battery; the method further comprises selecting the second discharge profile from the plurality of discharge profiles based on the current state-of-charge being below a second threshold level state-of-charge that is different from a first threshold level state-of-charge associated with the first discharge profile; and the applying of the discharge mode includes applying the discharge mode according to the second discharge profile.

Example 8. The method of example 7, wherein: the second discharge profile is configured to cause the battery to be discharged at least a second discharge rate over a second predefined time period; and the second discharge rate is different from the first discharge rate.

Example 9. The method of example 8, wherein: the second discharge profile is a step profile having multiple discharge rates each having a corresponding time period; and the multiple discharge rates of the second discharge profile are applied sequentially according to the corresponding time periods.

Example 10. The method of example 9, wherein the second threshold level state-of-charge defines a 30% state-of-charge.

Example 11. The method of any preceding example, further comprising: responsive to the completion of the discharge mode and prior to applying the charge mode, applying a pre-charge mode to charge the battery according to a pre-charge profile.

Example 12. The method of example 11, wherein the pre-charge profile defines at least a first slow-charge rate over a first predefined time period.

Example 13. The method of example 12, wherein: the pre-charge profile further defines a second slow-charge rate over a second predefined time period; and the second slow-charge rate is greater than the first slow-charge rate.

Example 14. The method of any one of examples 11 to 13, further comprising selecting the pre-charge profile from a plurality of pre-charge profiles based on the at least one of the plurality of discharge profiles used to discharge the battery.

Example 15. An electronic device comprising: a battery for providing power to the electronic device; a memory for storing computer-executable instructions; and a processor for executing the instructions stored in the memory to implement a battery-manager module, the battery-manager module configured to: detect an electrical connection to an external power source for charging a battery of the electronic device; in response to the detecting, delay the charging of the battery to perform a health check of the battery; determine one or more current battery conditions; determine previous battery conditions of the battery between a most-recent charge event and a time of the detecting of the electrical connection to the external power source, the previous battery conditions including temperature data of the battery and battery-usage data, the battery-usage data indicating that the battery has been in an idle state or a low-power state over a duration of time; determine a value indicative of an average temperature of the battery over the duration of time based on the temperature data; based on the one or more current battery conditions, the duration of time being greater than a time threshold, and the value indicative of the average temperature being greater than a temperature threshold, apply a discharge mode prior to initiating a charge mode for the battery, the discharge mode configured to cause the battery to be discharged according to at least one of a plurality of discharge profiles to relax and refresh an anode structure of the battery; and after completion of the discharge mode, apply the charge mode to cause the battery to be charged according to at least one of a plurality of charge profiles.

Example 16. The electronic device of example 15, wherein: the plurality of discharge profiles include at least a first discharge profile and a second discharge profile; and the first discharge profile or the second discharge profile includes a step profile having multiple discharge rates each having a corresponding time period.

Example 17. The electronic device of example 16, wherein: the one or more current battery conditions include a current state-of-charge of the battery; and the battery-manager module is further configured to select the first discharge profile from the plurality of discharge profiles based on the current state-of-charge being below a first threshold level state-of-charge.

Example 18. The electronic device of example 17, wherein the first threshold level state-of-charge defines a range between 80% state-of-charge and 30% state-of-charge.

Example 19. The electronic device of example 17, wherein: the battery-manager module is configured to select the second discharge profile from the plurality of discharge profiles based on the current state-of-charge being below a second threshold level state-of-charge that is different from the first threshold level state-of-charge associated with the first discharge profile; and the second discharge profile comprising a pulse discharge profile defining at least one frequency pulse discharge, at least one discharge rate, and at least one corresponding time period to discharge the battery.

Example 20. The electronic device of example 17, wherein the battery-manager module is configured to, if the current state-of-charge is at or below 0% state-of-charge, apply a pre-charge mode to slowly charge the battery according to a default pre-charge profile prior to applying the discharge mode.

Example 21. An electronic device comprising: a battery for providing power to the electronic device; a memory for storing computer-executable instructions; and a processor for executing the instructions stored in the memory to implement a battery-manager module, the battery-manager module configured to perform the method of any one of examples 1 to 14.

CONCLUSION

Although aspects of extending battery life after long-term and high-temperature storage have been described in language specific to features and/or methods, the subject of the appended claims is not necessarily limited to the specific features or methods described. Rather, the specific features and methods are disclosed as example implementations of the techniques for extending battery life after long-term and high-temperature storage, and other equivalent features and methods are intended to be within the scope of the appended claims. Further, various different aspects are described, and it is to be appreciated that each described aspect can be implemented independently or in connection with one or more other described aspects.

What is claimed is:

1. A method performed by an electronic device, the method comprising:

detecting an electrical connection to an external power source for charging a battery of the electronic device;

in response to the detecting, delaying the charging of the battery;

determining one or more current battery conditions;

determining previous battery conditions of the battery between a most-recent charge event and a time of the detecting of the electrical connection to the external power source, the previous battery conditions including temperature data of the battery and battery-usage data, the battery-usage data indicating that the battery has been in an idle state or a low-power state over a duration of time;

determining a value indicative of an average temperature of the battery over the duration of time based on the temperature data;

based on the one or more current battery conditions, the duration of time being greater than a time threshold, and the value indicative of the average temperature being greater than a temperature threshold, applying a discharge mode prior to initiating a charge mode for the battery, the discharge mode configured to cause the battery to be discharged according to at least one of a plurality of discharge profiles; and after completion of the discharge mode, applying the charge mode to cause the battery to be charged according to at least one of a plurality of charge profiles.

2. The method of claim 1, wherein the plurality of discharge profiles includes a first discharge profile configured to cause the electronic device to discharge the battery at a first discharge rate over a first predefined time period.

3. The method of claim 2, wherein the first discharge profile is a step profile having multiple discharge rates each having a corresponding time period.

4. The method of claim 3, wherein the multiple discharge rates of the first discharge profile are applied sequentially according to the corresponding time periods.

5. The method of claim 2, wherein:

the one or more current battery conditions include a current state-of-charge of the battery;

the method further comprises selecting the first discharge profile from the plurality of discharge profiles based on the current state-of-charge being below a threshold level state-of-charge; and the applying of the discharge mode includes applying the discharge mode according to the first discharge profile.

6. The method of any one of claim 5, wherein the threshold level state-of-charge defines a range between 80% state-of-charge and 30% state-of-charge.

7. The method of claim 2, wherein:

the plurality of discharge profiles includes a second discharge profile that is different from the first discharge profile;

the one or more current battery conditions include a current state-of-charge of the battery;

the method further comprises selecting the second discharge profile from the plurality of discharge profiles based on the current state-of-charge being below a second threshold level state-of-charge that is different from a first threshold level state-of-charge associated with the first discharge profile; and the applying of the discharge mode includes applying the discharge mode according to the second discharge profile.

8. The method of claim 7, wherein:

the second discharge profile is configured to cause the battery to be discharged at least a second discharge rate over a second predefined time period; and the second discharge rate is different from the first discharge rate.

9. The method of claim 8, wherein:

the second discharge profile is a step profile having multiple discharge rates each having a corresponding time period; and the multiple discharge rates of the second discharge profile are applied sequentially according to the corresponding time periods.

10. The method of claim 9, wherein the second threshold level state-of-charge defines a 30% state-of-charge.

11. The method of claim 1, further comprising:

responsive to the completion of the discharge mode and prior to applying the charge mode, applying a pre-charge mode to charge the battery according to a pre-charge profile.

12. The method of claim 11, wherein the pre-charge profile defines at least a first slow-charge rate over a first predefined time period.

13. The method of claim 12, wherein:

the pre-charge profile further defines a second slow-charge rate over a second predefined time period; and the second slow-charge rate is greater than the first slow-charge rate.

14. The method of claim 11, further comprising selecting the pre-charge profile from a plurality of pre-charge profiles based on the at least one of the plurality of discharge profiles used to discharge the battery.

15. An electronic device comprising:

a battery for providing power to the electronic device;

a memory for storing computer-executable instructions; and a processor for executing the instructions stored in the memory to implement a battery-manager module, the battery-manager module configured to:

detect an electrical connection to an external power source for charging the battery of the electronic device;

responsive to the detection, delay the charging of the battery to perform a health check of the battery;

determine one or more current battery conditions and determine previous battery conditions of the battery between a most-recent charge event and a time of the detection of the electrical connection to the external power source, the previous battery conditions including temperature data of the battery and battery-usage data, the battery-usage data indicating that the battery has been in an idle state or a low-power state over a duration of time;

determine a value indicative of an average temperature of the battery over the duration of time based on the temperature data;

based on the one or more current battery conditions, the duration of time being greater than a time threshold, and the value indicative of the average temperature being greater than a temperature threshold, apply a discharge mode prior to initiating a charge mode for the battery, the discharge mode configured to cause the battery to be discharged according to at least one of a plurality of discharge profiles; and after completion of the discharge mode, apply the charge mode to cause the battery to be charged according to at least one of a plurality of charge profiles.

16. The electronic device of claim 15, wherein the plurality of discharge profiles includes a first discharge profile configured to cause the electronic device to discharge the battery at a first discharge rate over a first predefined time period.

17. The electronic device of claim 16, wherein:

the first discharge profile is a step profile having multiple discharge rates each having a corresponding time period; and the multiple discharge rates of the first discharge profile are applied sequentially according to the corresponding time periods.

18. The electronic device of claim 16, wherein:

the one or more current battery conditions include a current state-of-charge of the battery;

the battery-manager module is further configured to select the first discharge profile from the plurality of discharge profiles based on the current state-of-charge being below a threshold level state-of-charge; and the discharge mode is applied according to the first discharge profile.

19. The electronic device of claim 16, wherein:

the plurality of discharge profiles includes a second discharge profile that is different from the first discharge profile;

the one or more current battery conditions include a current state-of-charge of the battery;

the battery-manager module is further configured to select the second discharge profile from the plurality of discharge profiles based on the current state-of-charge being below a second threshold level state-of-charge that is different from a first threshold level state-of-charge associated with the first discharge profile; and the discharge mode is applied according to the second discharge profile.

20. The electronic device of claim 16, wherein the battery-manager module is further configured to, responsive to the completion of the discharge mode and prior to application of the charge mode, apply a pre-charge mode to charge the battery according to a pre-charge profile.

* * * * *